(12) United States Patent
Gumprecht et al.

(10) Patent No.: US 7,854,478 B2
(45) Date of Patent: Dec. 21, 2010

(54) VEHICLE SEAT

(75) Inventors: Michael Gumprecht, Nassenfels (DE); Rudiger Deppe, Lenting (DE)

(73) Assignee: Faurecia Autositze GmbH (DE)

( * ) Notice: Subject to any disclaimer, the term of this patent is extended or adjusted under 35 U.S.C. 154(b) by 290 days.

(21) Appl. No.: 12/100,994

(22) Filed: Apr. 10, 2008

(65) Prior Publication Data

US 2008/0258521 A1 Oct. 23, 2008

(30) Foreign Application Priority Data

Apr. 20, 2007 (DE) .................. 10 2007 018 717

(51) Int. Cl.
*B60N 2/42* (2006.01)
*B60N 2/427* (2006.01)

(52) U.S. Cl. .................. 297/216.14; 297/216.17; 297/216.19

(58) Field of Classification Search ............ 297/216.14, 297/216.17, 216.19
See application file for complete search history.

(56) References Cited

U.S. PATENT DOCUMENTS 6,247,752 B1 * 6/2001 Bowers ............... 297/216.14 X
6,786,543 B2 * 9/2004 Andersson et al. ..... 297/216.14
7,604,080 B2 * 10/2009 Breed .................... 297/216.14

FOREIGN PATENT DOCUMENTS

DE 19931804 3/2000
DE 19927503 12/2000
DE 19931894 1/2001

* cited by examiner

*Primary Examiner*—Anthony D Barfield
(74) *Attorney, Agent, or Firm*—Barnes & Thornburg LLP

(57) ABSTRACT

The invention relates to a vehicle (1), particularly a motor vehicle (1), comprising a vehicle seat (2), wherein the vehicle (1) comprises an actuator (25) for generating a load reducing movement of the vehicle seat (2) in case of a rear collision and a control means (10) for actuating the actuator (25) when a first threshold value relating to the amount of the rear collision is exceeded and a second threshold value relating to the amount of the rear collision is not exceeded.

9 Claims, 2 Drawing Sheets

VEHICLE SEAT

FIELD OF THE INVENTION

The present invention relates to a motor vehicle comprising a vehicle seat, wherein the vehicle comprises an actuator for generating a load reducing movement. The present invention further relates to method for using such a motor vehicle.

BACKGROUND INFORMATION

Document DE 199 27 503 A1 discloses a seat for an occupant of a motor vehicle comprising a one- or multi-piece underframe which can be connected fixedly to a bottom of the motor vehicle as well as a seat part comprising a seat back which is displaced with respect to the underframe oppositely to the driving direction by an inertia force which is applied by the vehicle occupant to the seat and thus is slightly lowered at its front end with respect to the driving direction or lifted up slightly at its rear end with respect to the driving direction when in case of an impact to the rear of the vehicle an inertia force or an acceleration of the vehicle exceeds a predetermined threshold value, wherein between the underframe and the seat part at least one guiding element is disposed which is connected pivotably to the seat part and the underframe and is pivoted during a backward movement of the seat part, thus pulling the seat part at its front end downwardly or pushing the seat part at its rear end upwardly.

Document DE 199 31 804 A1 discloses a device comprising a seat back, a seat bottom and a bearing carrying the seat back on the seat bottom in the pivoting direction relatively to the seat bottom, wherein the device comprises a releasable locking means which engages with the seat back to block a pivoting movement of the seat back relative to the seat bottom, wherein a means is provided which is releasable for disengaging said locking means from the seat back in case of a vehicle collision, and wherein a means for dissipating collision energy by continuously decelerating the pivoting movement of the seat back relative to the seat bottom under the influence of vehicle collision forces is provided.

Document DE 199 31 894 A1 discloses a vehicle seat comprising an adjustable seat back which is connected to a driving means which is actuatable in case of a rear collision at the vehicle, wherein the seat back is tilted forwardly in case of a rear collision und then performs an opposite backward movement, which is decelerated by an energy absorber.

It is an object of the invention to provide an improved occupant protection. It is a further object of the invention to provide for better whiplash protection

SUMMARY OF THE INVENTION

The above object is achieved by a vehicle, particularly a motor vehicle, comprising a vehicle seat, wherein the vehicle comprises an actuator for generating a load reducing movement of the vehicle seat in case of a rear collision and a control means for actuating the actuator when a first threshold value relating to the amount of rear collision is exceeded, and wherein the actuation of the actuator can be blocked by the control means when a second threshold value relating to the amount of rear collision is exceeded. The above object is also achieved by a vehicle, particularly a motor vehicle, comprising a vehicle seat, wherein the vehicle comprises an actuator for generating a load reducing movement of the vehicle seat in case of a rear collision and a control means for actuating the actuator when a first threshold value relating to the amount of rear collision is exceeded and a second threshold value relating to the amount of rear collision is not reached (or not exceeded). In this way a particularly appropriate security against whiplash trauma is provided or whiplash trauma can be reduced. Herein the load reducing movement of the vehicle seat especially for absorption of kinetic energy can be adjusted between the first and the second threshold value.

Generating a load reducing movement in the sense of the invention can be implemented by generating a load reducing movement in a strict sense or preferably by unlocking a latch for releasing a load reducing movement. A load reducing movement in a strict sense of the invention is particularly a movement for absorbing kinetic energy of an occupant using the vehicle seat. A load reducing movement in the sense of the invention is particularly a downward movement of the vehicle seat, a backward movement of the vehicle seat and/or a backward tilting rotational movement. A rear collision in the sense of the invention is particularly a collision which presses an occupant using the vehicle seat into the vehicle seat. An amount of the rear collision is particularly defined by an acceleration, a maximum value of an acceleration or an estimated or expected maximum value of an acceleration.

In a preferred embodiment of the invention the first threshold value is smaller than the second threshold value. In another preferred embodiment of the invention the first threshold value is approximately 5 g±30% (1 g≈9.8 m/s$^2$, wherein "g" is the acceleration due to gravity). The first threshold value is particularly chosen such that it corresponds to an impact velocity in the range between approximately 16 km/h and 24 km/h. In a further preferred embodiment of the invention the second threshold value is approximately 10 g ±30%. The second threshold value is particularly chosen such that it corresponds to an impact velocity of approximately 30 km/h. In a still further preferred embodiment of the invention the vehicle comprises a sensory mechanism for detecting a rear collision. The sensory mechanisms can also include a so called precrash sensory mechanism.

The above object is also achieved by a method of operating a vehicle—which particularly comprises one or more of the above mentioned characteristics—wherein by means of the vehicle seat a load reducing movement is performed when a first threshold value relating to the amount of rear collision is exceeded, but is not performed when a second threshold value relating to the amount of rear collision is exceeded.

The above object is further achieved by a method of operating a vehicle—which particularly comprises one or more of the above mentioned characteristics—wherein by means of the vehicle seat a load reducing movement is performed when a first threshold value relating to the amount of rear collision is exceeded as long as the amount of rear collision does not exceed a second threshold value.

DETAILED DESCRIPTION

Figure 1:
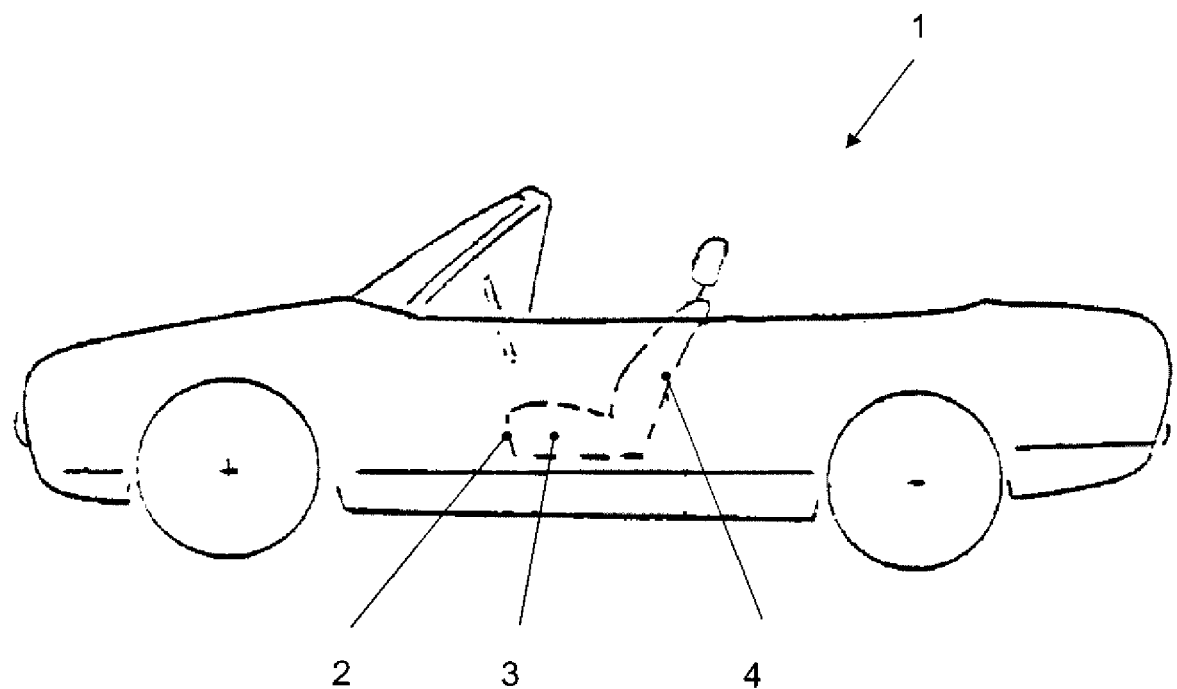
FIG. 1 shows an example embodiment of a motor vehicle.
Figure 2:
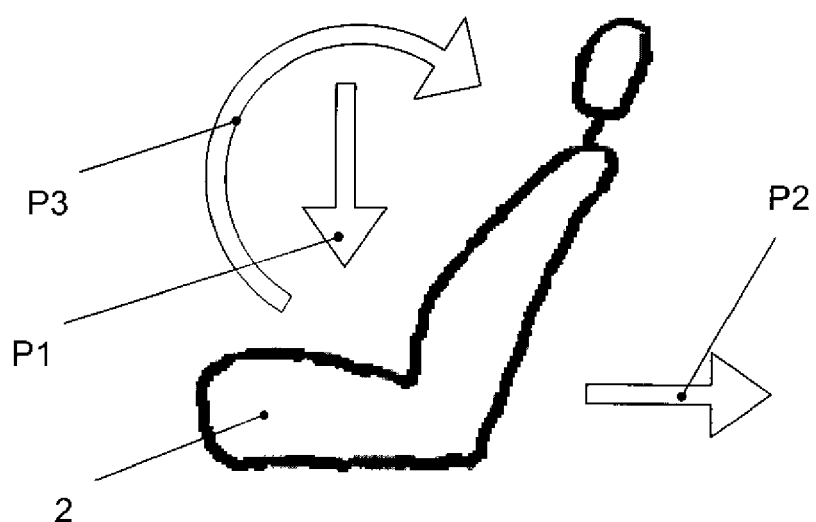
FIG. 2 shows an example embodiment of a vehicle seat.
Figure 3:
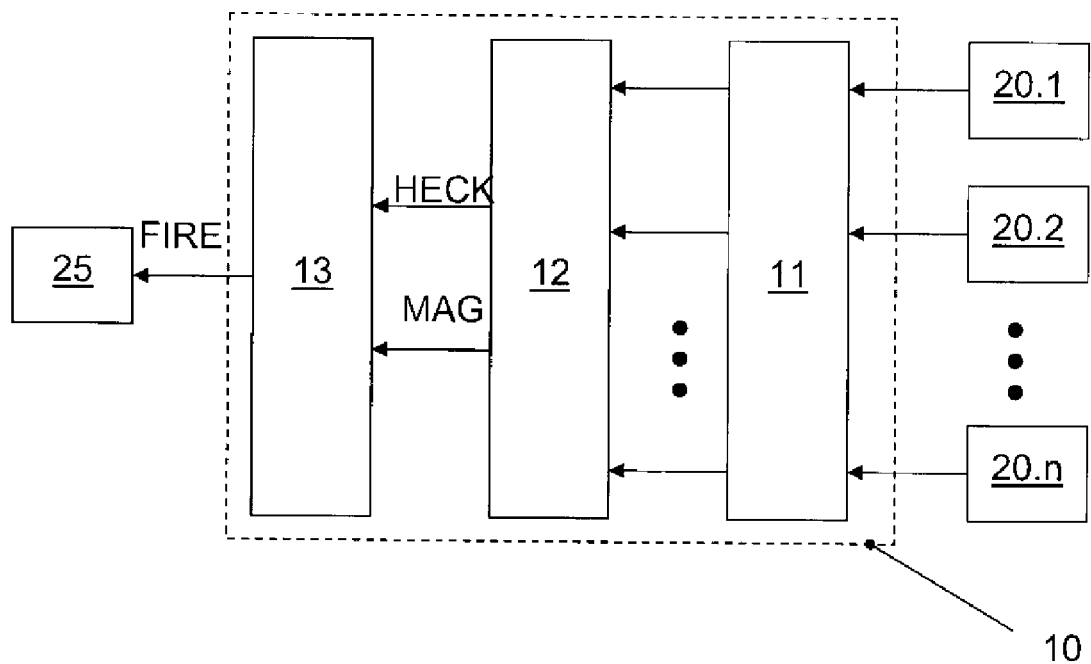
FIG. 3 shows an example embodiment of a control means.

FIG. 1 shows an example embodiment of a motor vehicle 1 comprising a vehicle seat—shown in an enlarged scale in FIG. 2. The vehicle seat 2 comprises a seat part 3 and a seat back 4. The motor vehicle 1 comprises an actuator 25—shown in detail in FIG. 3—for generating a load reducing movement of the vehicle seat 2 in case of a rear collision and a control means 10—also shown in FIG. 3—for actuating the actuator 25 when a first threshold value relating to the amount of rear collision is exceeded while simultaneously a second threshold value relating to the amount of rear collision is not exceeded. Generating a load reducing movement can be implemented by generating a load reducing movement in a strict sense or preferably by unlocking a latch for releasing a load reducing movement as described, for example, in DE 199 27 503 A1 or DE 199 31 804 A1. The motor vehicle 1 can comprise mechanisms similiar to those disclosed in DE 199 27 503 A1 or DE 199 31 804 A1. Preferably a mechanism is provided, by means of which the load reducing movement is implemented as downward movement P1 (see FIG. 2) of the vehicle seat 2, backward movement P2 of the vehicle seat 2 and/or backward tilting rotational movement P3 of the vehicle seat 2.

The motor vehicle 1 comprises a sensory mechanism comprising one or more sensors 20.1, 20.2, . . . 20.$n$ for detecting a rear collision and other types of collisions, if required. The sensory mechanism can also comprise a so called precrash sensory mechanism. The control means 10 further comprises a signal processing means 11 for processing or conditioning signals supplied from the sensors 20.1, 20.2, . . . 20.$n$ and an evaluating module 12 for determinig the type and amount of a collision depending on output signals of the signal processing means 11. The evaluating module 12 correspondingly outputs a variable HECK indicating whether a rear collision occurs as well as a variable MAG indicating a maximum value of an acceleration or an estimated or expected maximum value of an acceleration. Based on this variables a trigger module 13 determines a trigger signal FIRE for the actuator 25.

Figure 4:
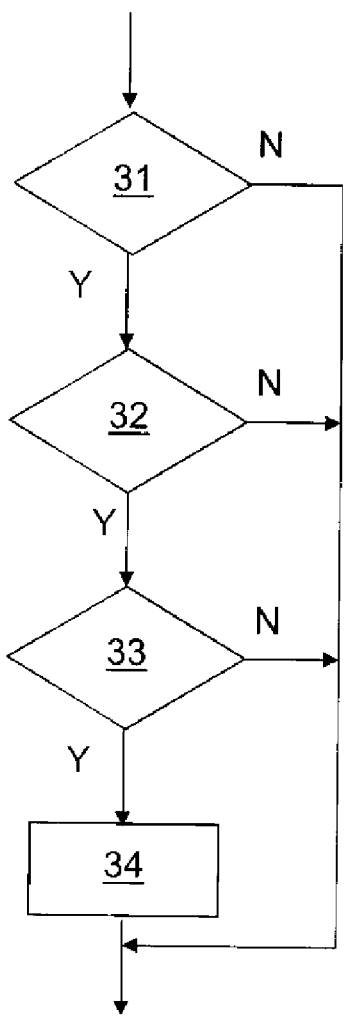
FIG. 4 shows an example embodiment of method implemented in a trigger module.

FIG. 4 shows an example embodiment of a method implemented in a trigger module 13. Herein in a determination step 31 by evaluating the variable HECK there is decided, whether a rear collision occurs. When the result in determination step 31 indicates, that a rear collision occurs, the flow proceeds from step 31 to a determination step 32 for deciding, if $$MAG > G1,$$

where G1 is a first threshold value. The first threshold value G1 is approximately 5 g±30% and is particularly chosen such that it corresponds to an impact velocity in the range between approximately 16 km/h and 24 km/h.

If $$MAG > G1$$

the flow proceeds from step 32 to a determination step 33 for deciding, if $$MAG \leq G2$$

where G2 is a second threshold value. The second threshold value is approximately 10 g±30% and is particularly chosen such that it corresponds to an impact velocity of approximately 30 km/h.

If $$MAG \leq G2$$

a next step 34 is executed, where the variable FIRE is set equal to "1" such that the actuator 25 is actuated.

The sensors 20.1, 20.2, . . . 20.$n$, the control means 10, the signal processing means 11 and/or the evaluating module can also be used by other safety devices, such as seat-belt tensioners or airbags and for driving and triggering these components, respectively. A part of the sensors 20.1, 20.2, . . . 20.$n$ can also be implemented in the control means 10.

The elements in the figures are not necessarily to scale taking into account simplicity and clarity. Thus, for example, the dimensions of some elements are shown exaggerated compared to those of other elements for a better understanding of the example embodiments of the present invention.

LIST OF REFERENCE SYMBOLS

1 Motor Vehicle
2 Vehicle seat
3 Seat part
4 Seat back
10 Control means
11 Signal processing means
12 Evaluating module
13 Trigger module
20.1, 20.2, . . . 20.$n$ Sensor
25 Actuator
31, 32, 33 Determination steps
34 Step for setting the variable FIRE equal to "1"
FIRE Trigger signal
HECK Variable for indicating, whether a rear collision occurs
MAG Variable for indicating a maximum value of an acceleration or an estimated or expected maximum value of an acceleration
P1 Downward movement
P2 Backward movement
P3 Backward tilting rotational movement

The invention claimed is:

1. Motor vehicle, the motor vehicle comprising:
a vehicle seat;
an actuator for generating a load reducing movement of the vehicle seat in case of a rear collision wherein the load reducing movement is one of a downward movement, backward movement and backward tilting rotational movement; and
a trigger module for generating a trigger signal for actuating the actuator when a first threshold value relating to the amount of the rear collision is exceeded unless a second threshold value relating to the amount of the rear collision is exceeded.

2. Vehicle according to claim 1, wherein the first threshold value is smaller than the second threshold value.

3. Vehicle according to claim 1, wherein the first threshold value is approximately 5 g ±30%.

4. Vehicle according to claim 1, wherein the second threshold value is approximately 10 g ±30%.

5. Vehicle according to claim 1, the motor vehicle further comprising: a sensory mechanism for detecting a rear collision.

6. Method of operating a motor vehicle comprising a vehicle seat, the method comprising:
generating a trigger signal when a first threshold value relating to the amount of a rear collision is exceeded, unless a second threshold value relating to the amount of the rear collision is exceeded, and
by means of an actuator generating a load reducing movement of the vehicle seat if the trigger signal is present wherein the load reducing movement is one of a downward movement, backward movement and backward tilting rotational movement.

7. Method according to claim 6, wherein the first threshold value is smaller than the second threshold value.

8. Method according to claim 6, wherein the first threshold value is approximately 5 g ±30%.

9. Method according to claim 6, wherein the second threshold value is approximately 10 g ±30%.

* * * * *